(12) United States Patent
De Castro et al.

(10) Patent No.: US 11,453,749 B2
(45) Date of Patent: Sep. 27, 2022

(54) THERMALLY STABLE CONDUCTIVE POLYMERS FOR ELECTROCHEMICAL GAS SENSOR APPLICATIONS

(71) Applicant: Advent Technologies Holdings, Inc., Boston, MA (US)

(72) Inventors: Emory Sayre De Castro, Nahant, MA (US); Christos L. Chochos, Athens (GR); Nora Gourdoupi, Patras (GR); Vasilis G. Gregoriou, Drosia Attica (GR); George Paloumbis, Patras (GR)

(73) Assignee: ADVENT TECHNOLOGIES HOLDINGS, INC, Boston, MA (US)

( * ) Notice: Subject to any disclaimer, the term of this patent is extended or adjusted under 35 U.S.C. 154(b) by 0 days.

(21) Appl. No.: 16/285,185

(22) Filed: Feb. 25, 2019

(65) Prior Publication Data

US 2019/0276602 A1    Sep. 12, 2019

Related U.S. Application Data

(60) Provisional application No. 62/635,582, filed on Feb. 27, 2018.

(51) Int. Cl.
*C08G 65/40*     (2006.01)
*G01N 27/404*    (2006.01)
*C08L 81/06*     (2006.01)
*C08G 75/23*     (2006.01)

(52) U.S. Cl.
CPC ......... *C08G 65/4037* (2013.01); *C08G 75/23* (2013.01); *C08L 81/06* (2013.01); *G01N 27/404* (2013.01)

(58) Field of Classification Search
CPC ..... C08G 65/4037; C08G 75/23; C08L 81/06; G01N 27/40
See application file for complete search history.

(56) References Cited

U.S. PATENT DOCUMENTS

| | | | |
|---|---|---|---|
| 2008/0063914 A1* | 3/2008 | Gourdoupi | H01M 4/92 429/492 |
| 2008/0063923 A1* | 3/2008 | Gourdoupi | H01B 1/122 528/391 |
| 2008/0070093 A1* | 3/2008 | Geormezi | H01M 8/1027 528/401 |
| 2008/0160378 A1* | 7/2008 | Geormezi | H01M 8/103 429/480 |
| 2008/0248364 A1* | 10/2008 | Gourdoupi | H01M 8/1039 521/27 |
| 2010/0047660 A1* | 2/2010 | Geormezi | C08G 65/4068 525/203 |

OTHER PUBLICATIONS

Yasuda et al., Macromolecules, vol. 36, No. 20, 2003.*

* cited by examiner

*Primary Examiner* — Shane Fang
(74) *Attorney, Agent, or Firm* — Davis Malm D'Agostine P.C.; David J. Powsner

(57) ABSTRACT

Aromatic polymers exhibiting thermal stability and conductivity upon imbibement into an acid are disclosed for electrochemical gas sensor applications. Membrane electrode assemblies for electrochemical gas sensors are also provided, comprising a sensing electrode, a counter electrode, and a polymer membrane comprising the polymers of the present invention, disposed between the sensing electrode and the counter electrode.

11 Claims, 1 Drawing Sheet

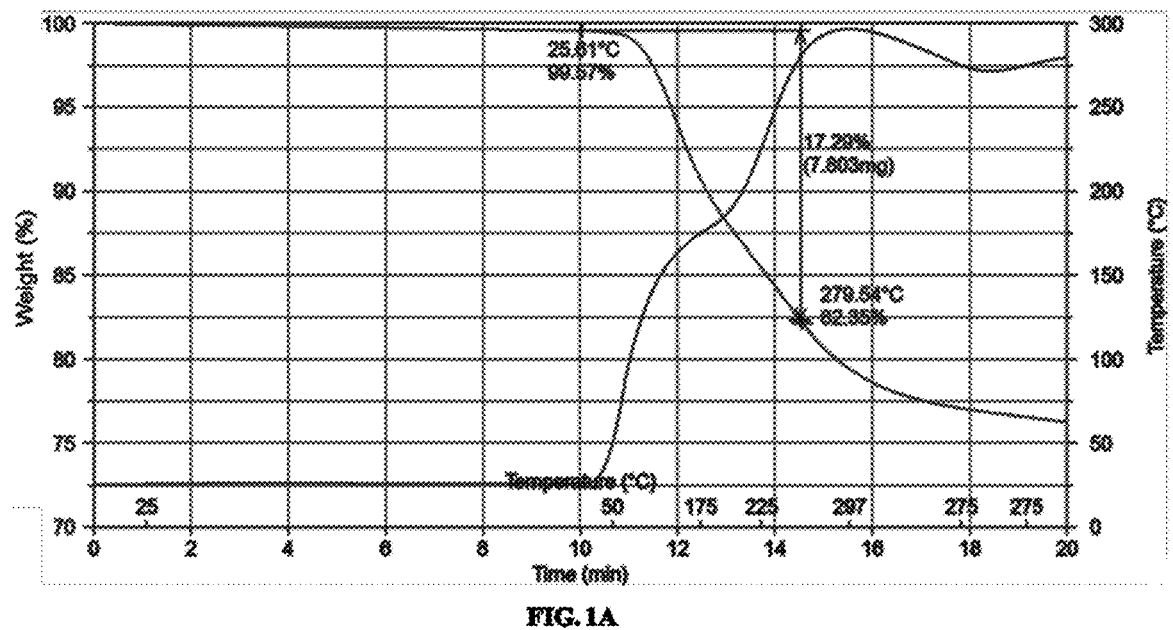
FIG. 1A
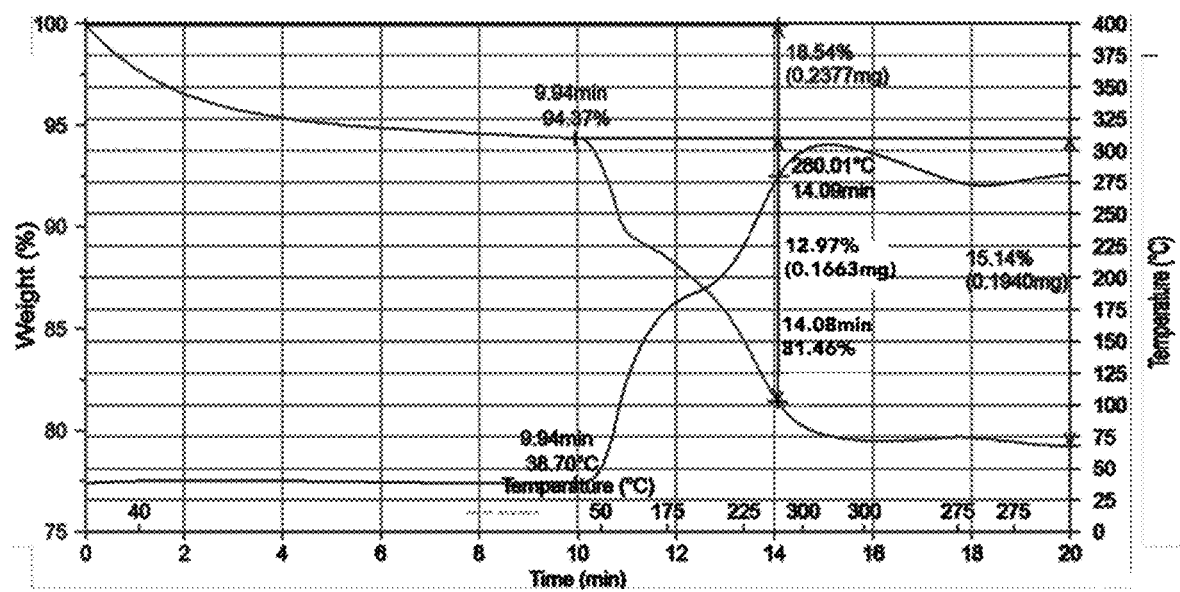
FIG. 1B
FIG. 1

THERMALLY STABLE CONDUCTIVE POLYMERS FOR ELECTROCHEMICAL GAS SENSOR APPLICATIONS

CROSS-REFERENCE TO RELATED APPLICATION

This application claims the benefit of U.S. Provisional Patent Application No. 62/635,582, filed Feb. 28, 2018, which is incorporated by reference herein in its entirety.

FIELD OF INVENTION

The present invention relates to an improvement in the assembly of electrochemical gas sensors through incorporating a class of thermally stable conductive aromatic polymers comprising aromatic groups containing one or more nitrogen groups whereby said class of polymers are infused in an inorganic acid.

DESCRIPTION OF THE RELATED ART

Electrochemical gas sensors are gas detectors used for measuring the concentration of a target gas by oxidizing or reducing the gas at an electrode and measuring the resulting current. The first electrochemical sensors were developed in 1950s for monitoring oxygen. By the mid-1980s, miniaturized electrochemical sensors came into existence for detecting various toxic gases. Currently, a wide range of electrochemical sensors are being used for various applications.

There are multiple methods of sensing distinct low density materials such as gases. Common methods include nondispersive infrared spectroscopy (NDIR), the use of metal oxide sensors, the use of chemiresistors, and the use of electrochemical sensors. The present invention pertains to electrochemical sensors.

An electrochemical gas sensor measures the concentration of a target gas by using oxidation or reduction reactions to generate positive or negative current flow through an external circuit. The basic components of an electrochemical sensor include a "working" electrode, a "counter" electrode and in most case a "reference" electrode. These components are combined inside the sensor housing with a liquid electrolyte. The top of the sensor has a membrane and diffusion limiting orifice through which ambient air interacts with the sensor's electrolyte.

As gas diffuses through the membrane and comes in contact with the electrolyte, an electrochemical reaction occurs. An oxidation reaction results in current flow from the working electrode to the counter electrode, while a reduction reaction results in current flow in the opposite direction. The magnitude of this current flow is proportional to the amount of gas present and is measured by an external electrochemical gas sensor circuit. This current is amplified, filtered and processed to obtain a calibrated reading in engineering units. Most electrochemical sensors output zero current when no target gas is present, and unlike catalytic bead sensors do not need a balance or zero adjustment.

An electrochemical gas sensor is available for just about any target gas, and across a wide range of sensitivities, such as a highly accurate electrochemical CO sensor. Although they are designed to be as specific as possible, most electrochemical sensors will respond in some manner to gases other than the target gas. This is called cross-sensitivity and is a result of the sensor's electrolyte reacting with gases that are more chemically active than the target gas. In some cases, certain gases can even cause a reverse reaction in the sensor chemistry that can mask the presence of the target gas.

Since electrochemical sensors depend on chemical processes whose rates are proportional to temperature, the output of most electrochemical sensors will vary with temperature. Having a thermally stable polymer contributes to more reliable readings over a wide range of ambient conditions.

One drawback with a conventional electrochemical sensor is that its size (e.g., volume of electrolyte and size of electrodes) is relative large so that it takes a long time to stabilize when subjected to the target gas. Further, since the change in current in response to a gas is small, there is a low signal to noise ratio, and there are losses and RF coupling due to metal traces leading to processing circuitry external to the sensor, further reducing the signal to noise ratio. Furthermore, the incorporation of sensors in portable devices places a premium on the smallest, lowest power-consuming sensors that provide fast responses. Thus, facile and reliable methods in making good electrical contact to such devices are desired.

Additionally, the electrochemical cell body is typically a polymer that cannot withstand temperatures above 150° C., and the electrolyte comprises an aqueous acid that cannot withstand temperatures above approximately 100° C. This prevents the electrical contacts from being soldered to a printed circuit board by reflowing the solder (typically at 180-260° C.) and prevents the use of some heat-cured conductive adhesives such as silver-containing epoxies, or anisotropic conductive films or pastes (typically cured at 120-150° C.). Traditional membranes employed in sensors, such as perfluorosulfonic acid as supplied by Chemours (Wilmington, Del.), porous polyethlyelene, or porous polypropylene do not have the thermal stability to survive direct soldering and thus need additional measures that increase the size and/or power needed to operate.

Electrochemical sensors make use of minimal power for their operation. In fact, the power consumption of these sensors is the lowest of all gas monitoring sensors, and thus the smaller the unit, the lower power is consumed. For this reason, electrochemical sensors are widely used in confined space applications such as monitoring indoor air quality and gas leaks, and with portable instruments consisting of multiple sensors.

Accordingly, what is needed is an electrochemical sensor for gases that does not have the drawbacks of the conventional sensor.

For fuel cells operating between 160 and 200° C., there is a class of thermally stable aromatic copolymers comprising aromatic moieties (or groups) containing one or more nitrogen groups infused in an inorganic acid [U.S. Pat. Nos. 7,754,843, 7,842,733, 7,786,244, 7,842,734, 7,842,775, U.S. patent application Ser. No. 13/367,855]. While these materials have shown great utility within this temperature range, it was unexpected that they could survive the solder reflow range of 180-280° C. FIG. 1 illustrates that while there is a minor weight loss for these materials, they survive over these critical assembly temperatures.

SUMMARY OF THE INVENTION

The subject invention relates to a class of thermally stable aromatic copolymers comprising aromatic groups containing one or more nitrogen groups infused in an inorganic acid as electrolytes in electrochemical gas sensors. Preferably, said aromatic copolymers are aromatic polyethers bearing pyridine groups. The invention further relates to membrane electrode assemblies incorporating the polymers of the present invention for use in electrochemical gas sensors.

BRIEF DESCRIPTION OF THE DRAWINGS

FIG. 1A is a thermogravimetric analysis of weight loss of 85% phosphoric acid, from room temperature to 280° C. Top trace is weight loss, bottom trace is temperature.

FIG. 1B is a thermogravimetric analysis of weight loss of structure 2 imbibed with 85% phosphoric acid, from room temperature to 280° C. Top trace is weight loss, bottom trace is temperature.

DETAILED DESCRIPTION OF THE INVENTION

The present invention relates to thermally stable conductive polymers with aromatic backbone comprising aromatic or heterocycle groups containing one or more nitrogen groups for electrochemical gas sensors with range of thermal stability between 180° C. and 280° C. and range of conductivity between 0.001 S/m to 1000 S/m when infused in an inorganic acid. In a preferred embodiment, said aromatic copolymers are aromatic polyethers bearing pyridine groups.

The following non-limiting structures of the materials are illustrative of the invention. All documents mentioned herein are incorporated herein by reference.

Structure 1
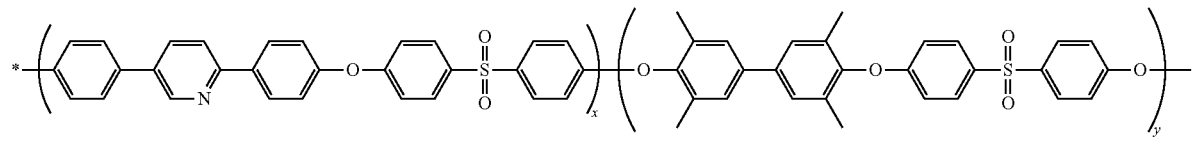

Structure 2
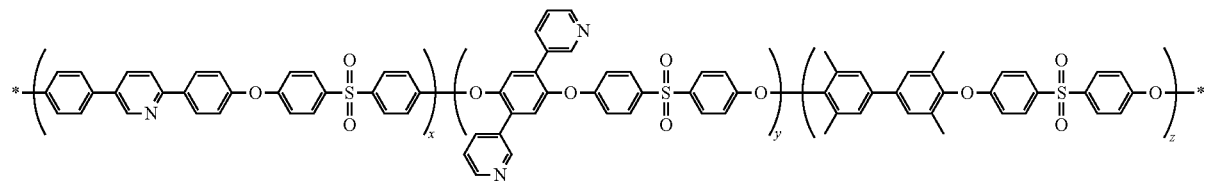

Structure 3
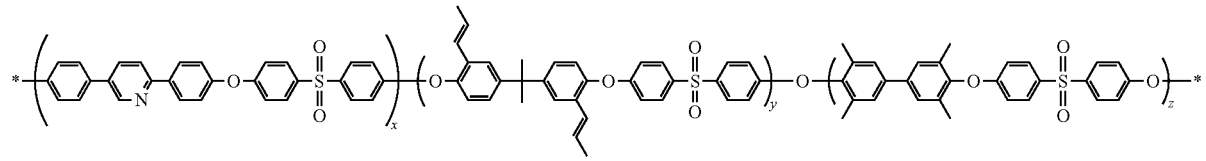

Structure 4
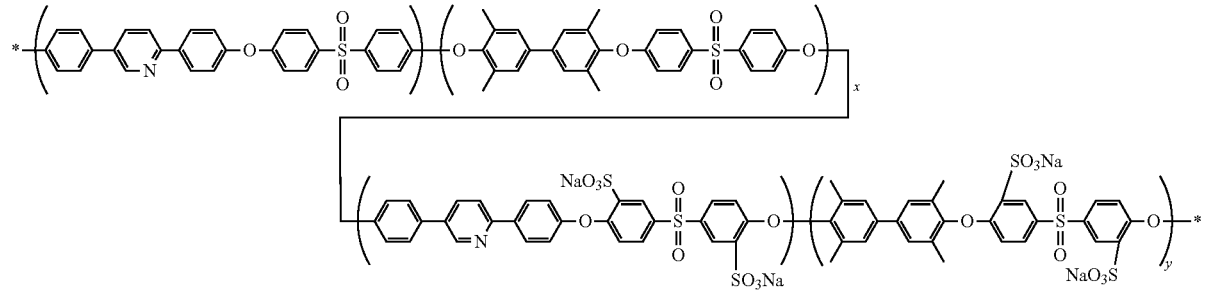

Structure 5
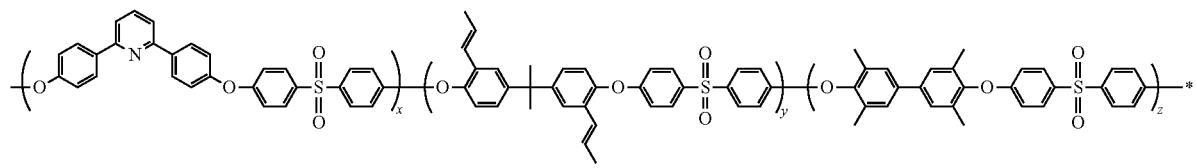

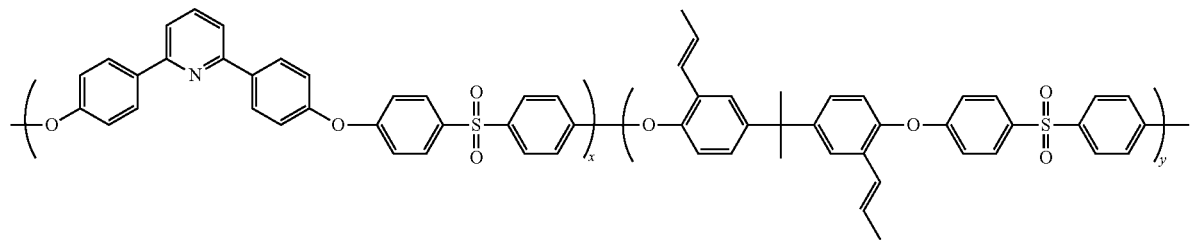

Structure 6

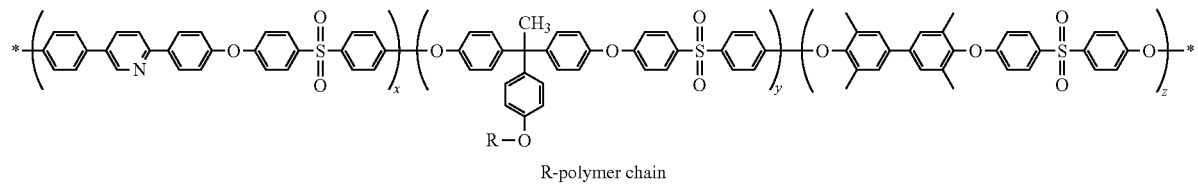

Structure 7

R-polymer chain and cross-linked variations of structures 1 to 7.

The invention also relates to membrane electrode assemblies for electrochemical gas sensors, comprising a sensing electrode, a counter electrode, and a polymer membrane disposed between the sensing electrode and the counter electrode, said polymer membrane comprising the polymers described herein. Compared to conventional sensors, these assemblies have the advantage of being compact, low energy-consuming, useful in high-temperature applications and very resistant to the high soldering temperatures.

The present disclosure is to be considered as an exemplification of the invention, and is not intended to limit the invention to the specific embodiments illustrated by the figures or described in the examples below.

Example 1

An acid-imbibed 2 cm² sample of the thermally stable aromatic backbone polymer of structure 2 is subjected to direct contact with molten solder, such as that commonly available (McMaster-Carr, www.mcmaster.com, part number 766A52). Prior to contact with the molten solder, the membrane sample is weighed. After the molten solder has solidified, it is removed and the membrane is weighted again. Table 1 illustrates three replicates of this process, and the resulting percent change in weight between 1.13% and 3.21% illustrates the thermal stability of this material even upon direct contact with molten solder, considered an extreme condition.

TABLE 1

Structure 2 membrane weight loss upon contact with molten solder

| Membrane Condition | Structure 2 Imbibed with 85% Phosphoric Acid and surface was pat dry | | | |
|---|---|---|---|---|
| Units used | Grams | | | |
| Measurement number | Before solder | After solder | Change in mass | % change |
| 1 | 0.0156 | 0.0151 | 0.0005 | 3.21% |
| 2 | 0.0151 | 0.0149 | 0.0002 | 1.32% |
| 3 | 0.0708 | 0.07 | 0.0008 | 1.13% |

Example 2

An acid imbibed sample of the polymer of structure 2 is subjected to high temperatures for an extended period of time, whereby the percent weight loss is recorded versus temperature. A thermogravimetric analyser is employed with a platinum cup to hold samples. The temperature ramp rate is set to maximum (>50° C. per minute) up to 200° C. whereby the overshoot in temperature, due to the fast ramp rate, extends to 280° C., the point where typical solder reflow occurs. A sample of pure 85% phosphoric acid is first subjected to this sequence in order to measure the amount of water and phosphoric acid vapor that would be lost. This is illustrated in FIG. 1A, whereby a total of 17.3% liquid weight is lost under this thermal profile. A sample of structure 2 is then imbibed with 85% phosphoric acid is subjected to the same thermal profile. FIG. 1B illustrates the results. In this case, a total of 18.5% weight is lost, a difference of 1.3%. Considering that the thermally stable aromatic polymer is subjected to these high temperatures for a much longer time than during a typical solder fabrication operation, FIG. 1B confirms the stability of this material.

The invention has been described in an illustrative manner, and it is to be understood that the terminology which has been used is intended to be in the nature of words of description rather than of limitation. Many modifications and variations of the present invention are possible in light of the above teachings.

What is claimed is:
1. A gas sensor comprising:
   A. a sensing electrode;
   B. a counter electrode;
   C. a conductive polymer disposed between the sensing electrode and the counter electrode;
   D. the conductive polymer comprising aromatic (heterocycle) moieties containing one or more nitrogen groups, wherein said conductive polymer is an aromatic polyether polymer bearing pyridine groups and imbibed with an inorganic acid.
2. The gas sensor of claim 1 wherein said conductive polymer is thermally stable in temperatures of 180° C. to 280° C.
3. The gas sensor of claim 1 where the range of conductivity of the conductive polymer is 0.001 S/m to 1000 S/m.

4. The gas sensor of claim 1, wherein said conductive polymer is any of linear, branched, comb-like, network, cross-linked, and star-shaped in architecture.

5. The gas sensor of claim 1 where the inorganic acid is selected from a group consisting of phosphoric acid, sulfuric acid, hydrochloric acid and nitric acid.

6. The gas sensor of claim 1 comprising a membrane electrode assembly that includes the sensing electrode, the counter electrode and a polymer membrane comprising the conductive polymer.

7. An electrochemical gas sensor comprising a conductive polymer thermally stable in temperatures greater than 180° C., wherein the conductive polymer comprises aromatic (heterocycle) moieties containing one or more nitrogen groups, and wherein the conductive polymer is an aromatic polyether polymer bearing pyridine groups and imbibed with an inorganic acid.

8. The electrochemical gas sensor of claim 7, wherein the conductive polymer is thermally stable in temperatures up to 280° C.

9. The electrochemical gas sensor of claim 7, where the range of conductivity of the conductive polymer is 0.001 S/m to 1000 S/m.

10. The electrochemical gas sensor of claim 7, wherein the conductive polymer is any of linear, branched, comb-like, network, cross-linked, and star-shaped in architecture.

11. The electrochemical gas sensor of claim 7, where the inorganic acid is selected from a group consisting of phosphoric acid, sulfuric acid, hydrochloric acid and nitric acid.

* * * * *